United States Patent Office 2,845,431
Patented July 29, 1958

---

2,845,431

ALKYL-PIPERIDIONES AND PROCESS FOR THE MANUFACTURE THEREOF

August Hans Lutz and Otto Schnider, Basel, Switzerland, assignors to Hoffmann-La Roche Inc., Nutley, N. J., a corporation of New Jersey No Drawing. Continuation of application Serial No. 349,564, April 17, 1953. This application October 23, 1956, Serial No. 617,705

Claims priority, application Switzerland April 22, 1952

8 Claims. (Cl. 260—297)

The present invention concerns a process for the manufacture of alkyl-piperidiones and intermediates in the said process.

The process provided by the invention comprises reacting a tetrahydropyridione of the general formula

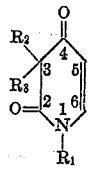

I wherein $R_1$ represents hydrogen or a methyl radical, and $R_2$ and $R_3$ stand for lower alkyl or alkenyl groups, such as, for example, methyl, ethyl, propyl, isopropyl, vinyl, isopropylene, allyl groups, with formaldehyde in an aqueous solution containing a neutral salt of sulfurous acid, preferably sodium or potassium sulfite, at a temperature below about 70° C., and catalytically hydrogenating the reaction product of the general formula

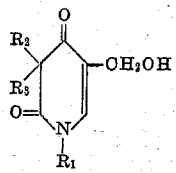

II $R_1$, $R_2$ and $R_3$ having the same meaning as above.

The hydrogenation may be interrupted as soon as the amount of hydrogen needed to hydrogenolize off the hydroxy group of the hydroxymethyl radical and to saturate unsaturated bonds which may be present in the substituents in 3-position, has been taken up. In such case, the product of the partial hydrogenation is a tetrahydropyridione of the general formula

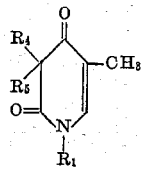

III wherein $R_1$ has the same meaning as above, and $R_4$ and $R_5$ represent lower alkyl groups.

The novel compounds of this formula are crystallized substances, which are easily soluble in the usual organic solvents, but difficultly soluble in water. They have acidic properties and form water-soluble salts with strong bases, such as alkali hydroxides. Furthermore, they possess powerful sedative and hypnotic properties, which make them suitable for therapeutic use.

The invention comprises also the alternative process of fully hydrogenating the compounds II until the absorption of hydrogen comes to an end. The alkylpiperidiones thus produced may be represented by the general formula

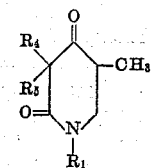

IV $R_1$, $R_4$ and $R_5$ having the same meaning as hereinbefore.

The latter compounds likewise have a strong sedative and hypnotic action; they are colorless, slightly soluble in water, but well soluble in the usual organic solvents, and may be distilled under reduced pressure without decomposition.

The tetrahydropyridiones of Formula I, used as starting material, may be prepared from the corresponding disubstituted acetoacetic acid esters (O. Schnider, Festschrift Emil Barell 1936, page 195). The formaldehyde employed in the first step of the process according to the invention may be in the form of the commercially available 38 percent aqueous solution thereof. Advantageously, the neutral salts of sulfurous acid should be present in the proportion of one mole or less as compared with the pyridione used as starting material. Said neutral salts may according to E. H. Riesenfeld, Lehrbuch der Anorganischen Chemie, 3rd edition, 1942, page 13, also be referred to as "normal salts."

*Example 1*

To a stirred suspension of 167 parts by weight of 2,4-dioxo-3,3-diethyl-tetrahydropyridine in a mixture of 500 parts by weight of water and 100 parts by weight of 38% aqueous formaldehyde solution are added at once, at 35° C., 20 parts by weight of sodium sulphite. A clear solution is formed, from which after some time crystals begin to separate. After two hours' stirring at the said temperature, the amount of crystals does not increase further. The mixture is cooled down, the crystals are sucked off and recrystallized first in water, then in acetone or benzene/petroleum ether; melting point 138–140° C.

197 parts by weight of the 2,4-dioxo-3,3-diethyl-5-hydroxymethyl-tetrahydropyridine so obtained are dissolved in 900 parts by weight of methanol and the solution obtained is hydrogenated under normal pressure in the presence of 50 parts by weight of a 2% palladium charcoal catalyst. If the hydrogenation is interrupted, after 1 mol of hydrogen is absorbed, then an almost quantitative yield of 2,4-dioxo-3,3-diethyl-5-methyl-tetrahydropyridine of melting point 142–143° C. is obtained. This compound is soluble with yellow color in dilute sodium hydroxide and precipitates therefrom upon acidification. If the hydrogenation is not interrupted, then the absorption of hydrogen comes to an end once 2 mols of hydrogen have been taken up. The 2,4-dioxo-3,3-diethyl-5-methyl-piperidine thus formed is isolated by separating off the catalyst and by concentrating the filtrate in vacuo. Melting point 74–75° C.

*Example 2*

181 parts by weight of 1-methyl-2,4-dioxo-3,3-diethyl-tetrahydropyridine are stirred for 2 hours at 50° C. with a mixture of 500 parts by weight of water, 100 parts by weight of 38% aqueous formaldehyde solution and 158 parts by weight of potassium sulphite. To isolate the 5-hydroxymethyl-compound, which melts at 68–70° C., the reaction mixture is extracted with benzene and the extraction product recrystallized in a benzene/petroleum ether mixture. Upon uninterrupted hydrogenation at 80° C. under a pressure of 142 p. s. i. in the presence of Raney nickel catalyst, the 5-hydroxymethyl-compound yields 1,5-dimethyl-2,4-dioxo-3,3-diethyl-piperidine of melting point 97° C.

If the hydrogenation is interrupted after the absorption of 1 mol hydrogen, then 1,5-dimethyl-2,4-dioxo-3,3-diethyl-tetrahydropyridine of melting point 68° C. is obtained. This compound is easily soluble in the usual organic solvents, but difficultly soluble in water.

*Example 3*

To a suspension of 195 parts by weight of 2,4-dioxo-3,3-di-n-propyl-tetrahydropyridine in 500 parts by weight of water are added at 50° C. 100 parts by weight of 38% aqueous formaldehyde solution and 50 parts by weight of sodium sulphite. The mixture is stirred for 4 hours, taken up in benzene, the benzene solution is concentrated and the residue recrystallized in dibutyl ether. Melting point 98° C.

225 parts by weight of the 2,4-dioxo-3,3-di-n-propyl-5-hydroxymethyl-tetrahydropyridine thus obtained are dissolved in 1000 parts by weight of methanol and hydrogenated at room temperature in the presence of a palladium charcoal catalyst. After absorption of 2 mols of hydrogen, the hydrogenation comes to an end. The solution is separated from the catalyst and concentrated. The residue, which consists of 2,4-dioxo-3,3-di-n-propyl-5-methylpiperidine, melts at 107° C.

If the hydrogenation is interrupted after the absorption of 1 mol of hydrogen, the product isolated is 2,4-dioxo-3,3-di-n-propyl-5-methyl-tetrahydropyridine of melting point 114° C. This compound is easily soluble in the usual organic solvents, and its sodium salt is water-soluble.

If 2,4-dioxo-3-methyl-3-ethyl-tetrahydropyridine is used as starting material and the hydrogenation is not interrupted, the product obtained is 2,4-dioxo-3,5-dimethyl-3-ethyl-piperidine of melting point 97–99° C.

*Example 4*

A mixture of 191 parts by weight of 2,4-dioxo-3,3-diallyl-tetrahydropyridine, 600 parts by weight of 7% aqueous formaldehyde solution and 126 parts by weight of sodium sulphite is stirred for 60 minutes. The oily 5-hydroxymethyl-compound formed is taken up in benzene and the benzene solution is concentrated.

221 parts by weight of 2,4-dioxo-3,3-diallyl-5-hydroxymethyl-tetrahydropyridine are hydrogenated in methanolic solution at 80° C. under a pressure of 142 p. s. i. in the presence of a Raney nickel catalyst. The compounds absorbs 4 mols of hydrogen. The catalyst is separated off, the filtrate is concentrated and the residue recrystallized in benzene/petroleum ether. The 2,4-dioxo-3,3-di-n-propyl-5-methyl-piperidine melts at 107° C. and is identical with the product obtained according to Example 3.

This application is a continuation of our copending application Serial No. 349,564, filed April 17, 1953, now abandoned.

We claim:

1. A process which comprises reacting below 70° C. a tetrahydropyridione of the general formula

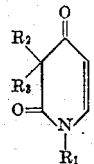

wherein $R_1$ is selected from the group consisting of hydrogen and methyl and $R_2$ and $R_3$ are selected from the group consisting of lower alkyl and lower alkenyl radicals, with formaldehyde in an aqueous solution containing a neutral salt of sulfurous acid, and subjecting the reaction product of the general formula

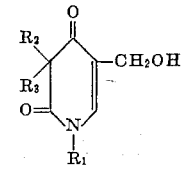

wherein $R_1$, $R_2$ and $R_3$ have the same meaning as above, to reaction with elemental hydrogen in the presence of a hydrogenation catalyst until sufficient hydrogen has been taken up to produce a compound of the general formula

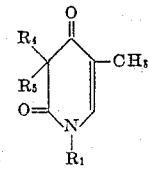

wherein $R_1$ has the same meaning as above, and $R_4$ and $R_5$ each represents a lower alkyl radical.

2. A process which comprises subjecting a compound of the general formula

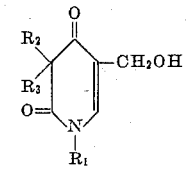

wherein $R_1$ is selected from the group consisting of hydrogen and methyl and $R_2$ and $R_3$ are selected from the group consisting of lower alkyl and lower alkenyl radicals, to reaction with elemental hydrogen in the presence of a hydrogenation catalyst until sufficient hydrogen has been taken up to produce a compound of the general formula

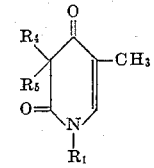

wherein $R_1$ has the same meaning as above, and $R_4$ and $R_5$ represent lower alkyl radicals.

3. A process which comprises subjecting a compound of the general formula

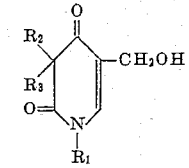

wherein $R_1$ is selected from the group consisting of hydrogen and methyl and $R_2$ and $R_3$ are selected from the group consisting of lower alkyl and lower alkenyl radicals, to reaction with elemental hydrogen in the presence of a hydrogenation catalyst until the absorption of hydrogen comes to an end, thereby producing a compound of the general formula

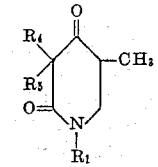

wherein $R_1$ has the same meaning as above, and $R_4$ and $R_5$ represent lower alkyl radicals.

4. A process which comprises reacting below 70° C. a tetrahydropyridione of the general formula

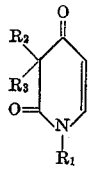

wherein $R_1$ is selected from the group consisting of hydrogen and methyl and $R_2$ and $R_3$ are selected from the group consisting of lower alkyl and lower alkenyl radicals, with formaldehyde in an aqueous solution containing a neutral salt of sulfurous acid so as to produce a compound of the general formula

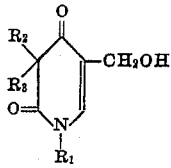

wherein $R_1$, $R_2$ and $R_3$ have the same meaning as above.

5. A process which comprises reacting below 70° C. a compound of the formula

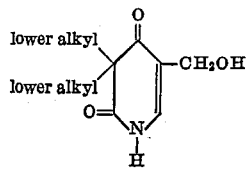

with formaldehyde in an aqueous solution containing an alkali metal sulfite so as to produce a product of the formula

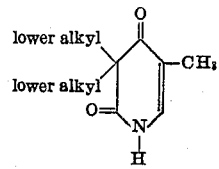

6. A compound having the formula

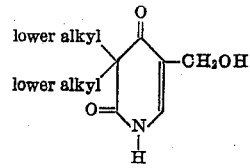

wherein $R_1$ is selected from the group consisting of hydrogen and methyl and $R_2$ and $R_3$ are selected from the group consisting of lower alkyl and lower alkenyl radicals.

7. A process which comprises subjecting a compound of the formula to reaction with elemental hydrogen in the presence of a hydrogenation catalyst until one molar proportion of hydrogen has been taken up, thereby producing a compound of the formula 8. 2,4-dioxo-3,3-diethyl-5-methyl-tetrahydropyridine.

References Cited in the file of this patent
UNITED STATES PATENTS

| | | |
|---|---|---|
| 2,090,068 | Preiswerk | Aug. 17, 1937 |
| 2,090,237 | Schnider | Aug. 17, 1937 |
| 2,137,192 | Schnider | Nov. 15, 1938 |
| 2,151,047 | Preiswerk | Mar. 21, 1939 |
| 2,523,231 | Masset | Oct. 10, 1950 |